United States Patent [19]
Collingbourne

[11] 3,830,009
[45] Aug. 20, 1974

[54] FISHING LINES
[75] Inventor: Terence David Collingbourne, Tewkesbury, England
[73] Assignee: Anglers Masterline Limited, Tewkesbury, Gloucestershire, England
[22] Filed: June 22, 1972
[21] Appl. No.: 265,310

[52] U.S. Cl. ............................................. 43/44.98
[51] Int. Cl. .................................... A01k 91/00
[58] Field of Search .................. 43/44.98; 57/140 R

[56] References Cited
UNITED STATES PATENTS
3,332,228  7/1967  Chill ................................. 57/140 R
3,464,140  9/1969  Carabasse ......................... 43/44.98
3,486,266  12/1969  Richardson et al. ............. 43/44.98
3,512,294  5/1970  Howald ............................ 43/44.98
3,676,237  7/1972  Peters ............................... 43/44.98

Primary Examiner—Louis G. Mancene
Assistant Examiner—Robert F. Cutting
Attorney, Agent, or Firm—Imirie and Smiley

[57] ABSTRACT

A fishing line has a main component formed from a chosen plastics material whose specific gravity is reduced by the incorporation therein, while in the liquid state, of a preferably inert gas during an extrusion process.

10 Claims, 4 Drawing Figures

FISHING LINES

This invention concerns improvements in fishing lines.

It is now quite common for fishing lines to be made from synthetic plastics materials and many such lines incorporate a 'mono-fil' or braided core.

Some known lines have their floatability or specific gravity adjusted by the incorporating of hollow microspheroidal particles or compounds releasing gas in the plastics materials from which they are made.

It is an object of the invention to provide fishing lines of easily adjustable specific gravity by a relatively cheap and simple process.

DETAILED DESCRIPTION OF THE INVENTION

Figure 1:
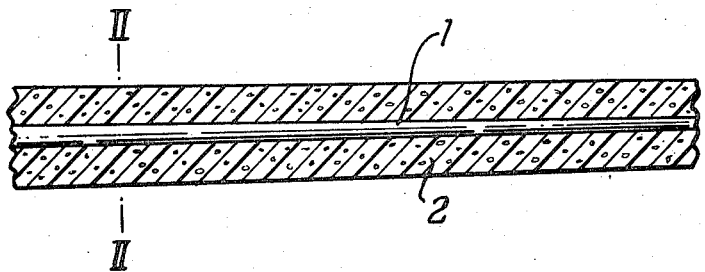
FIG. 1 is a cross-sectional view taken longitudinally through a length of fishing line in accordance with the present invention.

According to the invention, from one aspect, we provide a fishing line at least a main component of which is a solid blown plastics material, as defined herein, chosen from the group comprising polyolefines, halogenated polyolefines and co-polymers thereof, nylon, polyesters, polyurethanes, and acrylonitrile-butadiene polymers and co-polymers extruded from a nozzle.

By "blown" plastics material we means one produced by a recently developed principle in which a preferably inert gas, such as nitrogen, is injected under pressure into the body of liquefied plastics material during its passage through an extruder. The process is described in British Pat. No. 1,315,661.

From another aspect of the invention we provide a fishing line of tapered form in which at least the major component is a blown plastics material, as above defined.

At least part of the length of a fishing line in accordance with the invention may have a specific gravity above that of the water in which it is used by virtue of the incorporation of filler material of a specific gravity greater than that of the plastics material.

Fishing lines in accordance with the invention may incorporate a core which may be 'mono-fil' or braided or twisted and of uniform diameter or tapered, whether or not a tapered finished line is required.

Various forms of finished lines are envisaged within the concept of the invention, some of which comprise multiple layers which may be tapered or of uniform thickness.

For example, a solid tapered blown plastics material line with or without incorporation of relatively dense fillers. Tapering of such a line may be achieved by conventional manufacturing techniques, one of which utilises variation of extrusion pressure (higher pressuree—larger diameter), another of which makes use of tapered groove contra-rotating rollers, and yet another a variable orifice die. As extruded such a line has an impervious outer skin.

A second form of line has a solid blown plastics material central body of uniform diameter, which is covered by a tapered unblown plastics material such as polyolefines, halogenated polyolefines and copolymers thereof, nylon, polyesters, polyurethanes, and acrylonitrile-butadiene polymers and co-polymers extruded from a nozzle, or any other protective coating of an organic nature. The unblown plastics covering may be extruded around the blown plastics central body with varying pressure or may be tapered by rolling. Relatively dense fillers may be incorporated in either layer.

A form of line similar to the above has the central body tapered and a substantially uniform thickness covering.

Yet another form of line has a 'mono-fil' or braided core with a covering a blown plastics material of substantially uniform thickness and a tapered outer covering of unblown plastics of the kind above referred to. Relatively dense fillers may be incorporated in either of the two outer layers. A modified form of the last described line has a tapered blown plastics layer over the central core and an outer layer of unblown plastics material of substantially even thickness.

Figure 2:
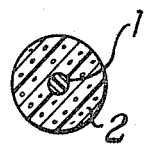
FIG. 2 is a cross-sectional view taken on line II—II of FIG. 1.

FIG. 1 illustrates a length of fishing line according to the present invention and having a tapered monofil core 1 surrounded by a blown plastics coating 2 of uniformly tapering thickness as shown in FIG. 2.

Figure 3:
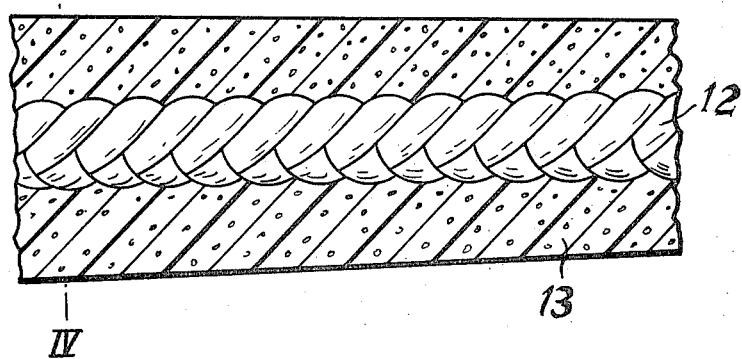
FIG. 3 is a longitudinal cross-sectional view of a modification.
Figure 4:
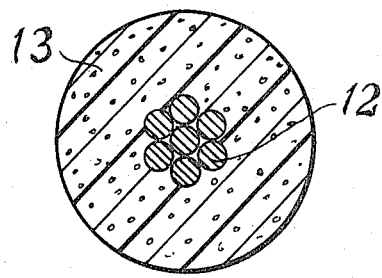
FIG. 4 is a cross-sectional view taken on line IV—IV of FIG. 3.

FIG. 3 illustrates an alternative form of the invention having a multifilament braided core 12 surrounded by a coating 13 of uniformly tapered thickness as shown in FIG. 4. In both instances the degree of tapering is exaggerated for clarity.

All of the above exemplary forms of line are of tapered final configuration and may be of such adjusted specific gravity as to float or sink, but of course non-tapered lines may be produced by omitting the tapering of the core or outer layer or layers.

I claim:

1. A fishing line at least a main component of which is a solid gas containing blown plastics material, chosen from the group consisting of polyolefines, halogenated polyolefines and co-polymers thereof, nylon, polyesters, polyurethanes, anacrylonitrile-butadiene polymers and co-polymers, extruded from a nozzle.

2. A fishing line according to claim 1 having a tapered configuration.

3. A fishing line according to claim 1 comprising filler material in at least part of its length and has a specific gravity greater than that of the water in which it is used.

4. A fishing line according to claim 1 incorporating a tapered core.

5. A fishing line according to claim 1 incorporating a mono-fil core.

6. A fishing line according to claim 1 incroporating a braided core.

7. A fishing line according to claim 1 incorporating a twisted core.

8. A fishing line according to claim 1 in which the said main component constitutes a core.

9. A fishing line according to claim 1 having at least one outer layer of solid unblown plastics material.

10. A fishing line according to claim 1 having an outer most layer of protective organic plastics material.

* * * * *